March 9, 1965  E. BORDINAT, JR  3,172,695
TONNEAU COVER

Filed Sept. 17, 1962  3 Sheets-Sheet 1

EUGENE BORDINAT, JR.
INVENTOR

BY John R. Faulkner
John J. Roethel
ATTORNEYS

EUGENE BORDINAT, JR.
INVENTOR

United States Patent Office 3,172,695
Patented Mar. 9, 1965

3,172,695
TONNEAU COVER
Eugene Bordinat, Jr., Bloomfield Hills, Mich., assignor to Ford Motor Company, Dearborn, Mich., a corporation of Delaware
Filed Sept. 17, 1962, Ser. No. 224,104
5 Claims. (Cl. 296—63)

This invention relates to a tonneau cover for convertible vehicle bodies.

One type of vehicle which currently has great appeal to a large segment of the automobile buying public is the so-called sports-car. Sports-cars in general are characterized by a low-slung appearance, a cockpit type passenger compartment having provision for only two occupants, bucket seats, and either a removable or a foldable top. The lack of seating capacity is considered the major disadvantage of this type of vehicle.

This lack of seating capacity is not found in conventional convertible vehicles which have a passenger compartment containing front and rear seats. The rear seats are, however, frequently unoccupied; and, when the convertible top is folded into its storage compartment, the unoccupied passenger compartment area to the rear of the front seat detracts from the general sporty appearance of the vehicle. This is particularly so when the vehicle has been equipped with some of the accessories usually associated with sports-cars, such as bucket seats for the front seats.

Accordingly, it is an object of the present invention to provide a removable, rigid tonneau cover particularly adapted to cover the portion of the passenger compartment to the rear of the front seats in a conventional convertible vehicle body. When the tonneau cover is in position, the vehicle body has the distinctive appearance of a two-seater sports-car. Quickly disengageable retention devices at the rear edge and a quick action latch mechanism at the forward edge of the tonneau cover are provided to releasably hold the latter in place on the vehicle body or to permit quick removal when access to the rear portion of the passenger compartment is desired.

Other objects, advantages and features of this invention will be made more apparent as this description proceeds, particularly when considered in connection with the accompanying drawings, wherein:

FIG. 4 is a side elevational view thereof; and

FIG. 5 is a sectional view taken on the line 5—5 of FIG. 3 looking in the direction of the arrows.

Figure 1:
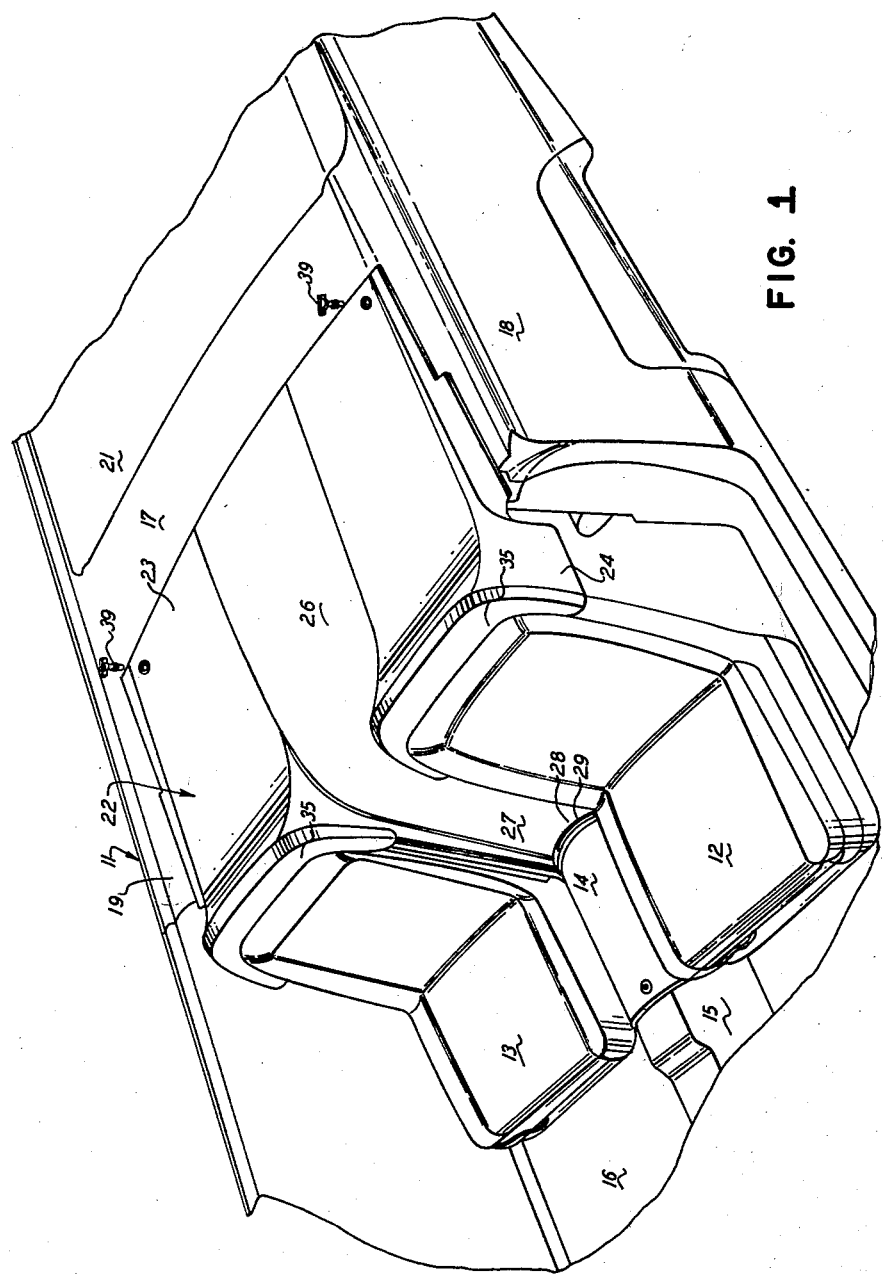
FIG. 1 is a perspective view of a fragmentary portion of a vehicle body with the tonneau cover embodying the present invention in position over the rear portion of the passenger compartment.

Referring now to the drawings and particularly to FIG. 1, the reference numeral 11 designates generally a portion of a vehicle body of the convertible type as it appears with the foldable top retracted and stored within a storage area to the rear of the passenger compartment. The passenger compartment is provided with a pair of laterally spaced bucket seats 12 and 13, one for the driver and one for a pasenger, respectively. To the rear of the bucket seats 12 and 13, which are the front seats of the passenger compartment, an additional full width rear seat (not visible) is usually provided. The two front seats 12 and 13 are separated by a console or a covered compartment 14 for gloves, tools, maps or the like, which straddles the drive shaft tunnel 15 in the floor 16 of the vehicle body.

To the rear of the passenger compartment, the vehicle body is bridged by a transverse panel 17 extending between the upper surfaces of the vehicle body rear quarter panels 18 and 19. The transverse panel 17 and the structural support therebeneath (not visible) divides the passenger compartment from the rear storage area or luggage compartment of the vehicle body. Access to this storage area is obtained through a hinged deck lid or luggage compartment lid 21.

The tonneau cover embodying the present invention is generally designated 22. Its function is to provide a cover for the portion of the passenger compartment to the rear of the front seats when it is desired to have the vehicle present a sport-car appearance. It also functions to provide a protective covering for the rear portion of the passenger compartment when the latter is unoccupied; and visual observation of vehicles traveling about streets and highways will confirm the fact that most vehicles are occupied by only a driver and perhaps one passenger.

Figure 2:
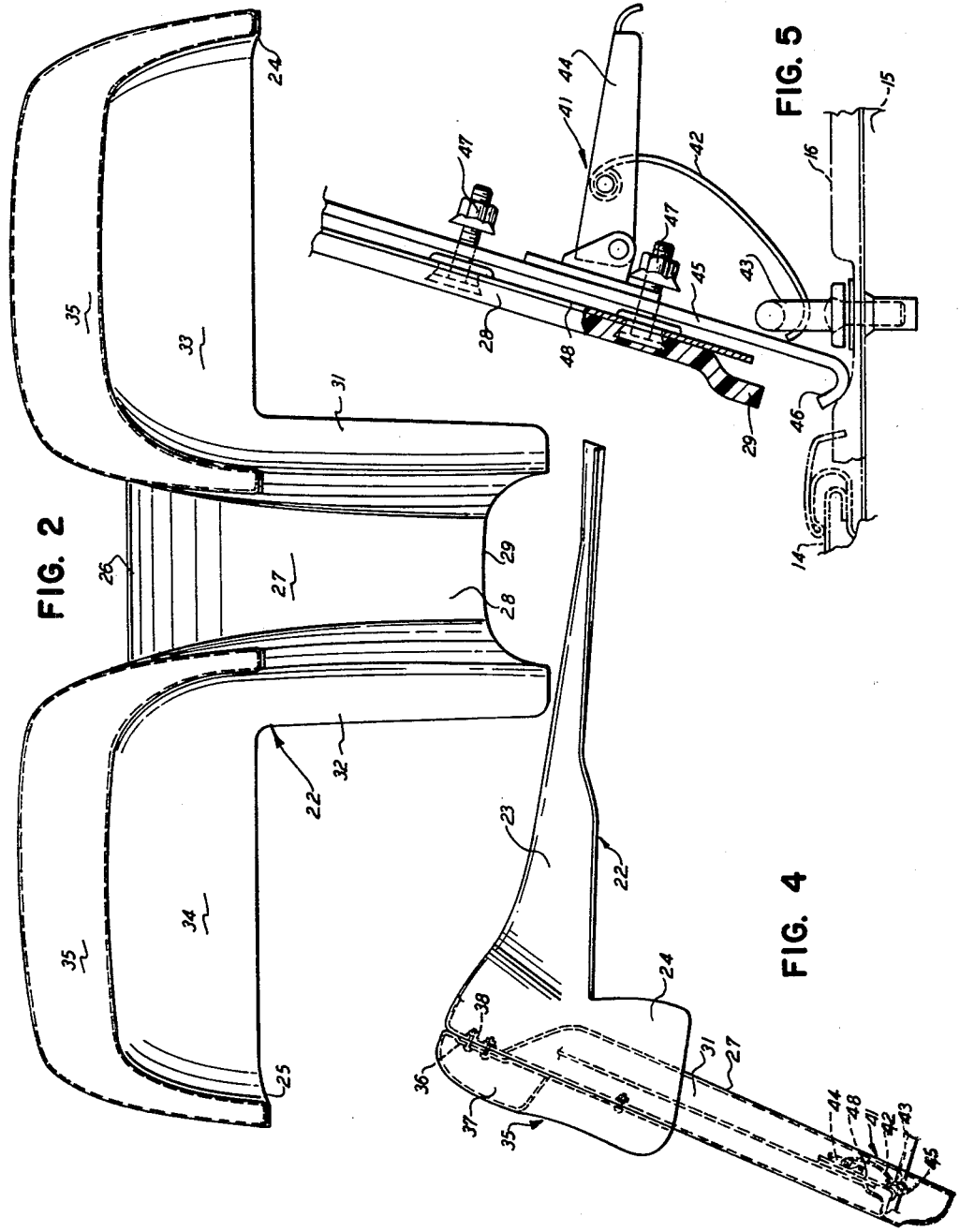
FIG. 2 is a front elevational view of the tonneau cover.
Figure 3:
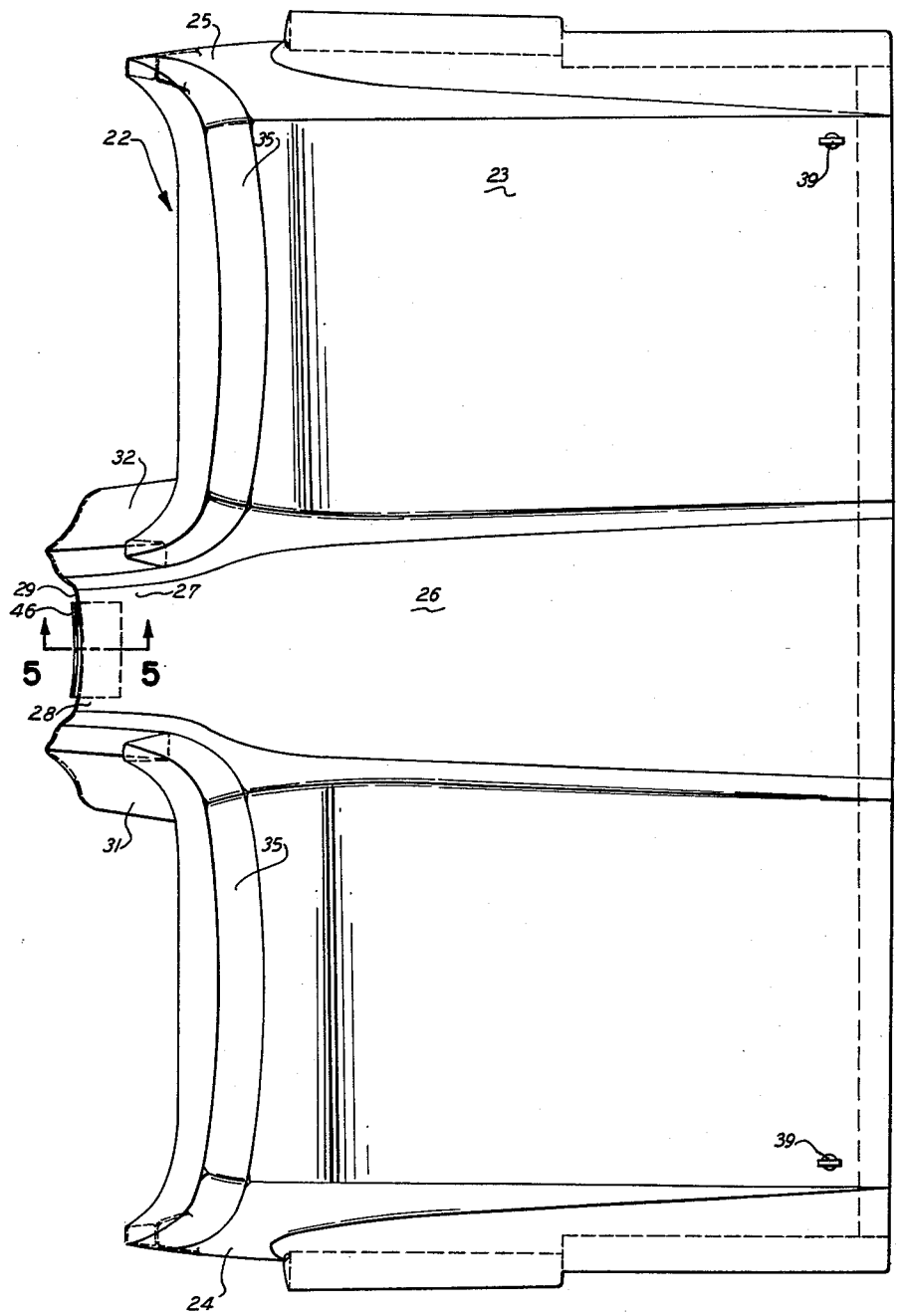
FIG. 3 is a plan view thereof.

Referring now to FIGS. 2 to 4, inclusive, the tonneau cover 22 comprises a panel 23 which is molded of a polyester resin material reinforced with glass fibers. This type of material is well-known for use in vehicle body panels and boat construction and is characterized by its light weight, rigidity and resistance to accidental indentation.

The panel 23 is molded of a width sufficient to span the distance between the top inner ridges of the quarter panels 18 and 19 of the vehicle body. The panel 23 is provided at its forward edge portions with contoured depending flanges 24 and 25. The center section 26 of the panel is slightly depressed and at its forward end blends into a downward depending leg or strut 27.

The strut section 27 is at an angle to the plane of the panel 23, the base 28 of the strut being some distance ahead of the leading edge of the panel. The base 28 of the strut 27 is curved, as at 29, to fit the contour of the drive shaft tunnel 15 of the vehicle floor. The side flanges 31 and 32 of the strut section 27 are contoured to fit the adjacent contours of the bucket seat backs so that when viewed from the front there are no see-through gaps between the seat backs and the sides of the strut 27.

Lying in substantially the same plane as the forward face of the flanges 31 and 32 are a pair of depending wings 33 and 34 which extend from the strut section to the forward edge of depending flanges 24 and 25, respectively. The depending wings extend downwardly from the leading edge of the panel 23 to a termination below the top surface of the seat backs. There is thus no see-through gap above each seat back.

A cushioned headrest 35 is mounted on the upper peripheral portion of each of the wings 33 and 34. Each headrest 35 comprises a sheet metal plate or support 36 which has a U-shaped appearance. Bonded to the front face of each support 36 is a foam rubber vinyl covered cushion 37 which also has a U-shaped appearance and which is complementary to the contour of the upper portion of the adjacent seat back. The headrest assemblies are mounted on the wings 33 and 34 by bolts 38 or other suitable fastening devices.

The tonneau cover is retained in place on the vehicle body by suitable releasable fastening devices. As illustrated in FIG. 1, a wing screw 39 is utilized to retain each outer rear corner of the panel 23 in flush relationship to the transverse panel portion 17 of the vehicle body. The wing screws 39 are threaded into suitable threaded apertures in the underlying vehicle body structure.

A toggle action latch mechanism generally designated 41 is utilized to secure the base 28 of the strut to the upper surface of the drive shaft tunnel 15. The details of this latch mechanism 41 are shown in the partially exploded view of FIG. 5. It will be noted that the latch mechanism has a pivoted hook element 42 which is adapted to engage a U-bolt 43 secured to the vehicle floor. The hook element 42 is pivotally carried on lever 44. The latter when swung upwardly from its FIG. 5 position causes the hook element 42 to pull the strut 27 toward the vehicle floor. An adjustable foot element 45 is provided to ensure that a tight latching action is obtained. The adjustable foot element comprises a wide steel strap or plate element having a curved end portion 46 bearing against the top of the drive shaft tunnel 15, the plate element being held in its adjusted position by means of the bolts 47 which project through the wall of the base 28 of the strut 27. The wall is reinforced at this area by a reinforcing plate 48.

To remove the tonneau cover 22 it is only necessary to release the latch mechanism 41 by flipping the latch lever 44 downwardly to disengage the hook element 42 from the U-bolt keeper 43. After disengagement of the wing screws 39, the tonneau cover 22 may then be lifted off the vehicle body. All of the seats in the vehicle are then available for use. When it is desired to return to a two-seater sports-car effect, the tonneau cover is merely lifted into place over the rear portion of the passenger compartment, the wing screws 39 are tightened down, and the latch mechanism 41 is engaged with the U-bolt keeper 43. The conversion is thus completed in a matter of minutes.

It will be understood that the invention is not to be limited to the exact construction shown and described, but that various changes and modifications may be made without departing from the spirit and scope of the invention, as defined in the appended claims.

I claim:

1. In a vehicle body having a floor formed with a longitudinally extending drive shaft tunnel at the center thereof,
    a passenger compartment containing front and rear seats,
    said front seats being located one on each side of said drive shaft tunnel with the back rests having a vertical gap therebetween,
    said passenger compartment being defined at its sides by the side walls of said vehicle body and at its rear by a transversely extending panel,
    a tonneau cover comprising a rigid panel molded from a glass fiber reinforced polyester resin,
    said panel at its rear edge overlying said transversely extending panel and at its forward edge being contiguous to the upper portions of said back rests,
    said panel being of a width sufficient to span the distance between the side walls of said vehicle body and having at its forward side edge portions contoured depending side flanges conforming to the outer contours of said back rests, respectively,
    the forward longitudinal center portion of said panel being depressed and blending into a strut extending downwardly into the gap between said back rests and terminating at the floor of said vehicle body,
    said strut having side flanges contoured to conform to the contiguous contours of said back rests,
    and depending wing portions at the forward edge of said panel lying in the same plane as the forward faces of the strut contoured side flanges and extending from the said strut to the forward edges of said contoured depending side flanges,
    said depending wing portions terminating below the top surfaces of the respective back rest portions.

2. In a vehicle body according to claim 1 in which a cushioned headrest is mounted on the upper peripheral portion of each of said depending wing portions,
    each headrest comprising a U-shaped metal plate,
    and foam rubber vinyl covered cushions bonded to the front face of said plate,
    said cushions being U-shaped in complementary relationship to the contour of the upper portion of the contiguous back rest.

3. In a vehicle body according to claim 1 in which said strut is angularly inclined relative to the plane of said panel so that its terminal end projects some distance ahead of the forward edge of said panel.

4. In a vehicle body according to claim 3 in which the terminal end of said strut is curved to the contour of said drive shaft tunnel.

5. In a vehicle body according to claim 3, in which securing means are provided for securing said tonneau cover rear edge portion to said transversely extending panel,
    and a latch means is mounted on the terminal end of said strut for engagement with keeper means on said drive shaft tunnel to secure said tonneau cover to said vehicle body floor.

References Cited in the file of this patent

UNITED STATES PATENTS

| | | |
|---|---|---|
| 2,686,076 | Helser | Aug. 10, 1954 |
| 2,743,029 | Mautner | Apr. 24, 1956 |
| 2,959,447 | Stebbins et al. | Nov. 8, 1960 |
| 2,998,272 | Newcomer et al. | Aug. 29, 1961 |

FOREIGN PATENTS

| | | |
|---|---|---|
| 246,268 | Great Britain | Jan. 28, 1926 |
| 278,964 | Great Britain | Oct. 20, 1927 |
| 455,769 | Great Britain | Oct. 27, 1936 |